US012659729B2

(12) United States Patent
Singh et al.

(10) Patent No.: US 12,659,729 B2
(45) Date of Patent: Jun. 16, 2026

(54) ELECTRONIC MONITORING SYSTEM INCLUDING LOW ENERGY BUTTON WITH CROWD SOURCED ALARM AND DISPATCH SERVICE

(71) Applicant: Arlo Technologies, Inc., Carlsbad, CA (US)

(72) Inventors: Rajinder Singh, San Jose, CA (US); Timothy Johnston, Los Gatos, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 185 days.

(21) Appl. No.: 18/243,899

(22) Filed: Sep. 8, 2023

(65) Prior Publication Data

US 2025/0088844 A1 Mar. 13, 2025

(51) Int. Cl.
| | |
|---|---|
| *H04L 29/06* | (2006.01) |
| *H04L 9/32* | (2006.01) |
| *H04W 4/06* | (2009.01) |
| *H04W 4/80* | (2018.01) |
| *H04W 4/90* | (2018.01) |
| *H04W 12/033* | (2021.01) |

(52) U.S. Cl.
CPC ........... *H04W 12/033* (2021.01); *H04W 4/06* (2013.01); *H04W 4/80* (2018.02); *H04W 4/90* (2018.02)

(58) Field of Classification Search
CPC ....... H04W 12/033; H04W 4/90; H04W 4/80; H04W 4/06

USPC ......................................................... 713/168
See application file for complete search history.

(56) References Cited

U.S. PATENT DOCUMENTS

| | | | |
|---|---|---|---|
| 11,606,669 | B2 | 3/2023 | Lopatin et al. |
| 2016/0294493 | A2 | 10/2016 | Daoura et al. |
| 2020/0329345 | A1 | 10/2020 | Haines et al. |
| 2021/0100069 | A1* | 4/2021 | Saldin ........................ H02J 9/06 |
| 2022/0393785 | A1 | 12/2022 | McRae |

FOREIGN PATENT DOCUMENTS

CA 3104241 A1 * 12/2019 ........ H04W 52/0254

* cited by examiner

*Primary Examiner* — Haresh N Patel

(74) *Attorney, Agent, or Firm* — Boyle Fredrickson, SC

(57) ABSTRACT

A method and an electronic monitoring system are provided. The electronic monitoring system includes a button having an actuatable actuator and an identity. The button is configured to encrypt a data packet corresponding to the identity of the button and broadcast the encrypted data packet over a wireless Personal Area Network (PAN), either periodically or in response to actuation of the actuatable actuator. The encrypted data packet is received with one of a plurality of user devices having a corresponding software application running thereon and is re-transmitted, along with a location of the user device, by the user device which received the encrypted data packet to a cloud-based control service. In response to the data packet received, the cloud-based control system either stores the location of the user device for future reference or generates an action in response thereto.

10 Claims, 4 Drawing Sheets

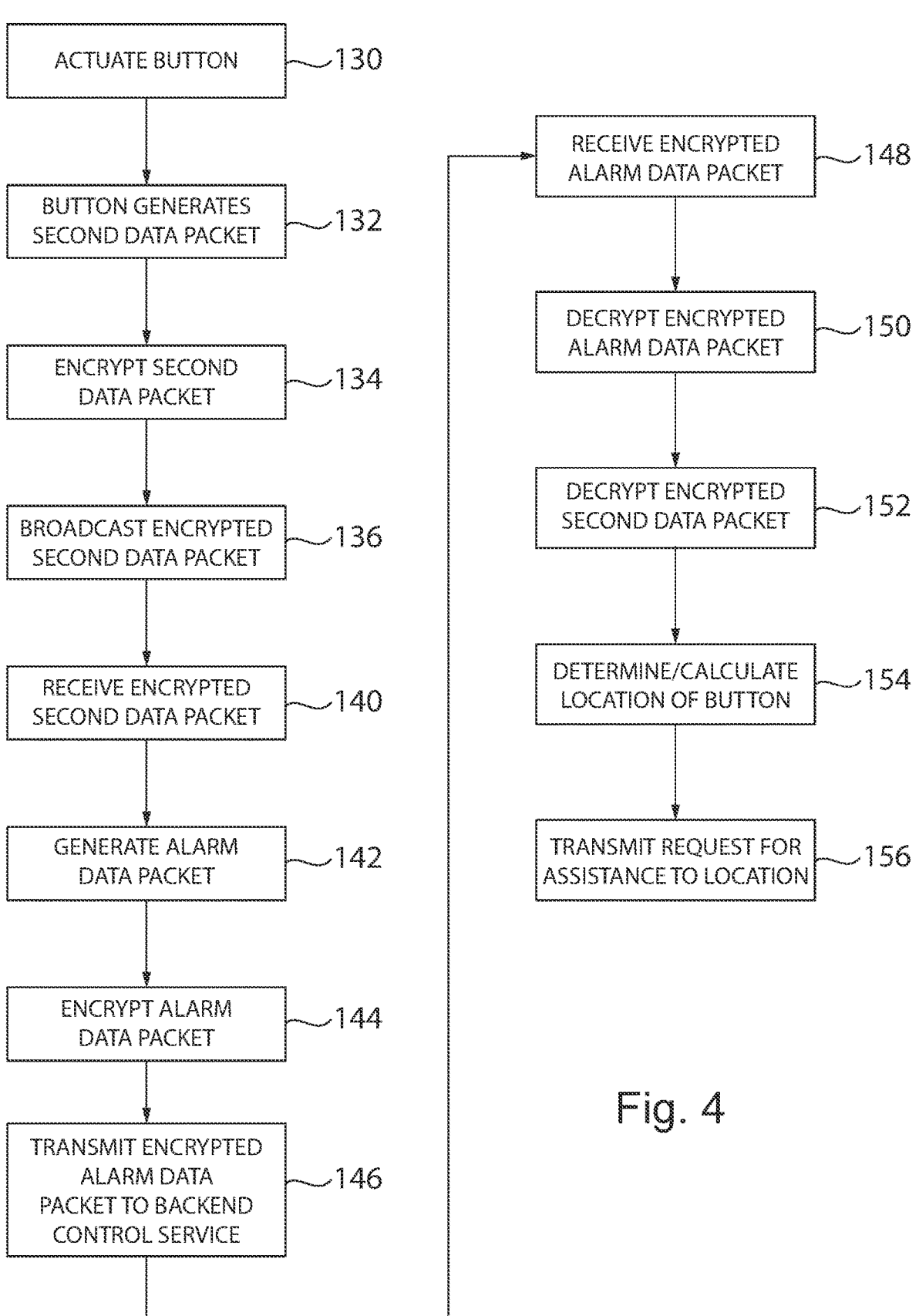

ACTUATE BUTTON — 130

BUTTON GENERATES SECOND DATA PACKET — 132

ENCRYPT SECOND DATA PACKET — 134

BROADCAST ENCRYPTED SECOND DATA PACKET — 136

RECEIVE ENCRYPTED SECOND DATA PACKET — 140

GENERATE ALARM DATA PACKET — 142

ENCRYPT ALARM DATA PACKET — 144

TRANSMIT ENCRYPTED ALARM DATA PACKET TO BACKEND CONTROL SERVICE — 146

RECEIVE ENCRYPTED ALARM DATA PACKET — 148

DECRYPT ENCRYPTED ALARM DATA PACKET — 150

DECRYPT ENCRYPTED SECOND DATA PACKET — 152

DETERMINE/CALCULATE LOCATION OF BUTTON — 154

TRANSMIT REQUEST FOR ASSISTANCE TO LOCATION — 156

Fig. 4

ELECTRONIC MONITORING SYSTEM INCLUDING LOW ENERGY BUTTON WITH CROWD SOURCED ALARM AND DISPATCH SERVICE

FIELD OF THE INVENTION

This invention relates generally to peripheral devices for electronic monitoring systems, and in particular, to an electronic monitoring system including a low energy button and a method that allow users to request emergency services utilizing a short-range wireless communication via crowd sourced tracking.

BACKGROUND OF THE INVENTION

The Internet is a global system of interconnected computers and computer networks that communicate with each other. The Internet of Things (IoT) applies this concept to a network of linked everyday objects which can communicate, be read, recognized, located, and controlled via the internet or other communication networks.

The number and variety of IoT devices continues to grow. In the area of automation of homes and buildings, smart homes and buildings may have centralized control over nearly any device or system in the home or office, from appliances to home and business security systems. In the field of asset tracking, commercial businesses, hospitals, factories, and large organizations can utilize IoT devices to track the locations of various assets such as equipment, patients, products, vehicles, etc. In the area of health and wellness, doctors can remotely monitor patients' health, and laypeople can track the progress of fitness routines. In the area of personal safety, individuals can track their own location or the location of others, receive location-based notifications, and request security intervention or emergency services through the use of low energy peripheral devices such as portable Bluetooth® Low Energy (BLE) buttons communicating using short range wireless communication protocols usable over a Personal Area Network (referred to herein as "personal area network communications" or "PAN communications). These communications most typically are Bluetooth®, but sometimes take the form of other communications such as Zigbee®, Z-Wave™, and MQTT™. For the sake of conciseness, the term "PAN communications protocol" will be understood to include Bluetooth®, Zigbee®, Z-Wave™, MQTT™, and other communications protocols operable in a short range in a PAN. Devices communicating via such a PAN communications protocol will be referred to herein as a "BLE" device.

Traditional electronic monitoring systems include various devices configured to capture, store and transmit visual images and/or audio of a monitored area within the environment. In addition, these systems may include one or more sensors that are configured to detect one or more types of conditions or stimulus, microphones, sound sensors, and speakers configured for audio communication or providing audible alerts, and BLE devices to actuate components or request security intervention/emergency services in response to a command by a user. The various components of the electronic monitoring system interact with a cloud-based backend system or control service that controls functions or provides various processing tasks for the components of the system. In addition, a user device, such as a PC or desktop computer, or such as a mobile device, e.g. a smart phone, a tablet or the like, may be used by a user to configure or communicate with the various components of the electronic monitoring system and the control service.

In order to set up an electronic monitoring system, a user establishes an account with a service provider, through the service provider's webpage or using the service provider's application on a user device. In the account, the user adds or onboards the various components of the electronic monitoring system associated with the user's account by utilizing, for example, a pre-populated list of devices and simply following a series of on-screen instructions. The process ensures that only the owner of the account has access to the various components and data associated with the account.

Once the account has been established and the various components been onboarded thereto, the user has the ability to request security intervention or emergency services through a BLE device associated with the account. However, in order to request security intervention or emergency services through a BLE device, the BLE device must be paired to the user device on which the service provider's application is operating and to which the owner of the account is logged-in. In the event a user wishes to request security intervention or emergency services through the BLE device, the user actuates a preprogrammed actuator on the BLE device which, in turn, transmits the request to the owner's user device on which the service provider's application is operating and to which the owner of the account is logged-in. In response to the received request, the owner's user device transmits the request, along with the location of the mobile device and other pertinent details, over a cellular communications network to a recipient, e.g., a call center or the cloud-based control service, to process the request.

While functional for its intended purpose, it can be appreciated that requiring the BLE device to be paired to an owner's user device in order to request security intervention or emergency services severely limits the effectiveness of the BLE device. In the most typical case of a user device being a mobile device, a user may not have their mobile device with them, or their mobile device may be out of power.

Consequently, there exists a need to enhance the capabilities of these prior BLE devices to allow users to request security intervention or emergency services in the event the user does not have access to their user device or the BLE device is out of communication range with their user device.

Therefore, it is a primary object and feature of the present invention to provide an electronic monitoring system including a low energy button and method that allow users to request emergency services utilizing a short range wireless communication via crowd sourced tracking.

It is a further object and feature of the present invention to provide an electronic monitoring system including a low energy button and method that allow users to request emergency services in the event the user does not have access to their mobile device or their low energy button device is out of communication range with their user device.

It is a still further object and feature of the present invention to provide an electronic monitoring system including a low energy button and method that allow users to request emergency services which is simple and inexpensive to implement.

SUMMARY OF THE INVENTION

In accordance with the present invention, an electronic monitoring system is provided. The electronic monitoring system includes a button having an actuatable actuator and an identity. A processor is operatively connected to the button and is configured to encrypt a first data packet corresponding to the identity of the button and to periodically broadcast the encrypted first data packet over a wireless Personal Area Network (PAN). A second data packet corresponding to a service request and the identity of the button is encrypted in response to actuation of the actuator and is broadcast over a communications network.

The electronic monitoring system may further include a cloud-based control service and a first user device having a processor and a software application stored in computer-readable memory. The button is associated with the first user device and the software application allows a user to communicate with and configure the button. A plurality of non-associated user devices are also provided. Each non-associated user device also includes a processor and a software application stored in computer-readable memory. Each of the plurality of non-associated user devices is configured to receive the encrypted first data packet and generate a third data packet including the encrypted first data packet and a location of the non-associated user device. The third data packet is encrypted and transmitted to the cloud-based control service.

Each of the plurality of non-associated user devices is configured to receive the encrypted second data packet and generate a fourth data packet including the encrypted second data packet and the location of the non-associated user device. The fourth data packet is encrypted and transmitted to the cloud-based control service. The cloud-based control service includes a processor and computer-readable memory. The processor of the cloud-based control service is configured to decrypt the first and third data packets. The identity of the button and location of the non-associated user device is stored in the computer-readable memory of the cloud-based control service for future reference. The processor of the cloud-based control service is also configured to decrypt the second and fourth data packets. The cloud-based control service generates an action in response to the service request, the identity of the button and the locations received from each of the non-associated user devices.

In accordance with a further aspect of the present invention, a method is provided of crowd sourced tracking of a low energy button utilizing short range wireless communication. The method includes the step of encrypting a first data packet corresponding to an identity of the button and periodically broadcasting the encrypted first data packet over a wireless Personal Area Network (PAN). The encrypted first data packet is received with one of a plurality of user devices. A tracking data packet including the encrypted first data packet and a location of the one of the plurality of user devices which are received the encrypted first data packet is generated and encrypted. The encrypted tracking data packet is transmitted to a cloud-based control service. A second data packet is encrypted in response to actuation of a service request actuator on the button. The second data packet includes a service request and the identity of the button. The encrypted second data packet is broadcast over the PAN. The encrypted second data packet is received with one of a plurality of user devices. An alarm data packet including the encrypted second data packet and a location of the one of the plurality of user devices which received the encrypted second data packet is generated and encrypted. The encrypted alarm data packet is transmitted to the cloud-based control service. The cloud-based control system decrypts the alarm data packet upon receipt and generates an action in response to the service request.

The one of the plurality of user devices which received the encrypted first data packet and the one of the plurality of user devices which received the encrypted second data packet may be the same user device and the action may include sending assistance to the location of the one of the plurality of user devices which received the encrypted second data packet. The method may include the additional step of configuring the button with an associated user device. The associated user device communicates with the button over the PAN. A software application may be provided on each of the plurality of user devices. The software application on the one of the plurality of user devices receiving the encrypted first data packet is configured to generate the tracking data packet. It is contemplated for the cloud-based control system to decrypt the encrypted tracking data packet upon receipt and store the decrypted tracking data packet to track a location of the button. The software application on the one of the plurality of user devices receiving the encrypted second data packet is configured to generate the alarm data packet.

In accordance with a still further aspect of the present invention, a method of crowd sourced tracking of a low energy button utilizing short range wireless communication is provided. The method includes the step of encrypting a data packet in response to actuation of a service request actuator on the button. The data packet includes a service request and the identity of the button. The encrypted data packet is broadcast over a wireless Personal Area Network (PAN). The encrypted data packet is received with one of a plurality of user devices. Each of the plurality of devices includes a software application which allows communication with the button over the PAN. An alarm data packet including the encrypted data packet and a location of the one of the plurality of user devices which received the encrypted second data packet is generated and encrypted. The encrypted alarm data packet is transmitted to a cloud-based control service. The cloud-based control system decrypts the alarm data packet upon receipt, and generates an action in response to the service request.

The action includes sending assistance to the location of the one of the plurality of user devices which received the encrypted data packet. The method may also include the step of configuring the button with an associated user device. The associated user device communicates with the button over the PAN. The data packet may be a service request data packet and the method may include the additional steps of encrypting an identity data packet corresponding to an identity of the button and broadcasting the identity data packet over the PAN. The encrypted identity data packet is received with one of the plurality of user devices. A tracking data packet including the encrypted identity data packet and a location of the one of the plurality of user devices which received the encrypted identity data packet is generated and encrypted. The encrypted tracking data packet is transmitted to the cloud-based control service. The cloud-based control system decrypts the tracking data packet and the identity data packet upon receipt. The identity of the button and the location of the one of the plurality of user devices which received the encrypted identity data packet is stored to track a location of the button.

The software application on the one of the plurality of user devices receiving the encrypted identity data packet being is configured to generate the tracking data packet. The one of the plurality of user devices which received the encrypted identity data packet and the one of the plurality of user devices which received the encrypted service request data packet may be the same user device. The encrypted identity data packet may be broadcast over the PAN at predetermined intervals. The software application on the one of the plurality of user devices receiving the encrypted service request data packet is configured to generate the alarm data packet.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 4 is a flowchart showing a third set of steps in the methodology of the present invention.

DETAILED DESCRIPTION OF THE DRAWINGS

Figure 1:
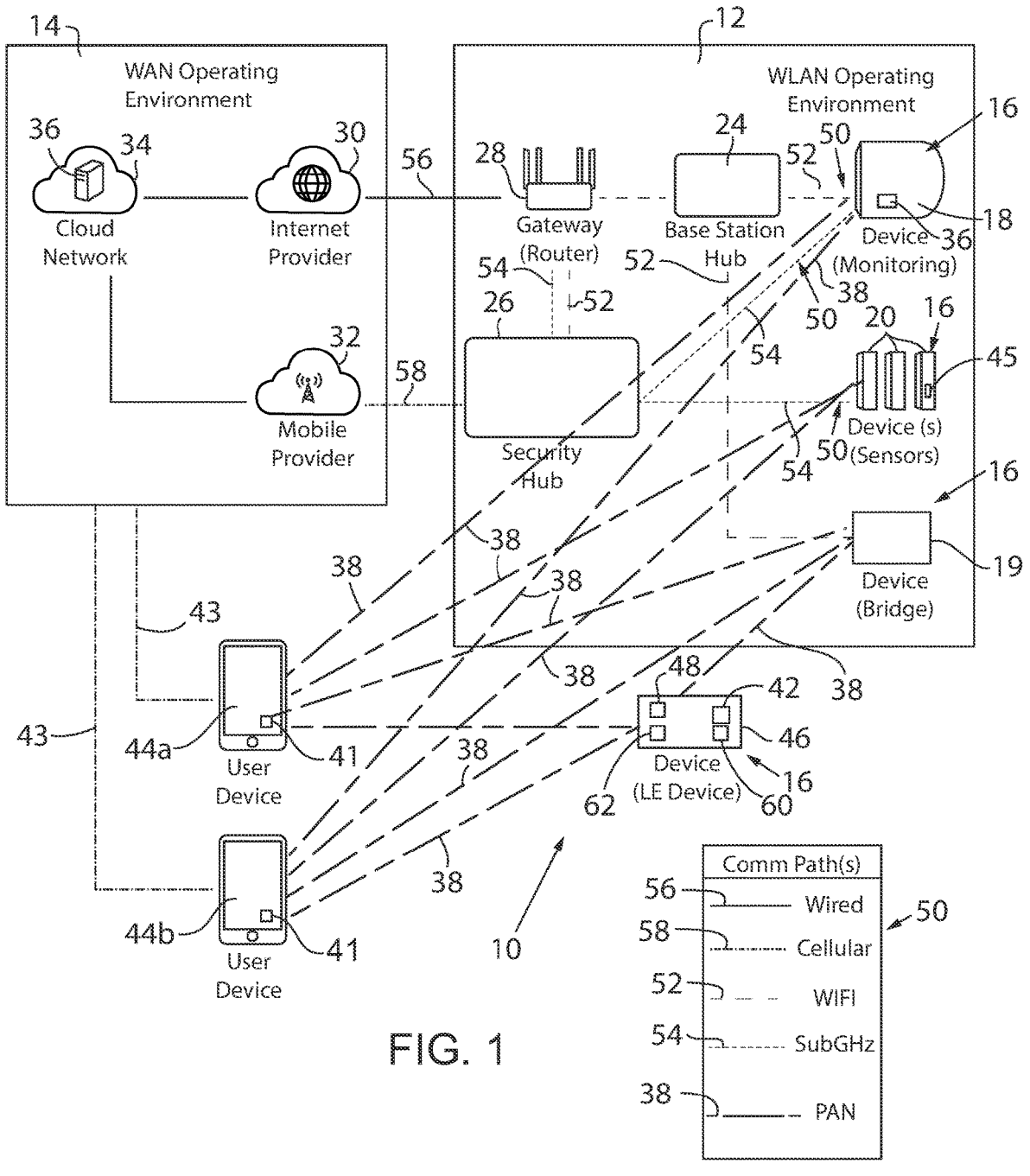
FIG. 1 is a block diagram of a system for electronic monitoring in accordance with one embodiment of the present invention.

Referring to FIG. 1, an electronic monitoring system 10 in accordance with an aspect of the present invention is generally shown. Electronic monitoring system 10 is implemented in a wireless communication operating environment. For example, wireless communication may be implemented by a WLAN (wireless local area network) operating environment (WLAN 12) or by communications technology on a personal area network (PAN) between the various components of electronic monitoring system 10 and/or one or more user devices 44, as hereinafter described. Two such user devices are shown in FIG. 1 and denoted 44a, 44b, respectively As mentioned above, communications may occur using Bluetooth® technology, but may also occur using Zigbee® or another short-range protocol. The term "PAN" should be understood to encompass all such communication technologies and protocols.

In the depicted embodiment, WLAN 12 is communicatively connected to a WAN (wide area network) operating environment, designated by the reference numeral 14. Within WLAN 12, various peripheral devices, also known as "client devices" 16, such as monitoring devices 18, bridges 19 and sensors 20, are wirelessly networked to a base station or high frequency hub 24 which, in turn, communicates with the WAN 14 via a gateway hub shown as gateway router 28. Base station hub 24 and router 28 provide a high frequency connection to WAN 14. Base station hub 24 may be eliminated as a stand-alone module if its functionality is incorporated into the gateway router 28, in which case the router 28 also serves as a base station hub. The system may also include a security hub 26 that communicates with monitoring device(s) 18 and with the WAN 14 and provides a low frequency connection between the WAN 14 and monitoring devices 18. If present, the security hub may also communicate with the router or hub 24, such as through a high frequency communication path 52 and/or a low frequency communication path 54 to the router 28. The security hub 26 is also provided with the capability of providing a high frequency connection with monitoring devices 18.

Still referring to FIG. 1, gateway router 28 is typically implemented as a Wi-Fi hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub, as well as the router. Another connection between WLAN 12 and WAN 14 may be provided between security hub 26 and a mobile provider 32. Mobile provider 32 includes hardware or system components or features to implement various cellular communications protocols such as 3G, 4G, LTE (long term evolution), 5G, or other cellular standard(s). Besides the mobile connection, security hub 26 typically also is configured to connect to WAN 14 by way of its connection to router hub 28 and the router hub's connection to WAN 14 through internet provider 30. Each of the internet provider 30 and mobile provider 32 allows the components of system 10 to interact with a backend system or control service that can control functions or provide various processing tasks of components of system 10, shown as a cloud-based backend control service system 34, which could be an Arlo SmartCloud™ system. The backend system, such as the cloud-based control service system 34 includes at least one cloud-based server 36, each of which includes at least a power supply, a system board, one or more CPUs, memory, storage, such as a sharable database, and a network interface. The at least one cloud-based server 36 typically provides, for example, cloud-base onboarding capabilities for peripheral client devices 16 as will be described in further detail below, cloud storage of data, for example events, AI (artificial intelligence) based processing such as computer vision, and system access to emergency services.

As noted above, the client devices 16 of electronic monitoring system 10 may include one or more monitoring devices 18 that are mounted to face toward respective areas being monitored, such as around a building or other structure or area. Monitoring devices 18 may perform a variety of monitoring, sensing, and communicating functions. Each monitoring device 18 includes firmware stored in non-volatile memory thereon. As is conventional, the firmware acts as the monitoring device's complete operating system, performing all control, monitoring and data manipulation functions. The system 10 may also include device(s) and system(s) that perform functions other than monitoring. Such devices include smart home devices such as HVAC control systems and components. They also could include one-touch type communication devices such as panic buttons and other communication buttons. One such button is marketed under Arlo Technologies, Inc. of Carlsbad, California under the brand name ARLO SAFE™. All of these devices and systems can be considered "monitoring devices" for purposes of the present discussion. Devices that communicate using LE protocols such as Bluetooth® can be considered "LE devices".

One such monitoring device 18 may include an imaging device, such as a video camera, that is configured to capture and store visual images or video of the monitored area within the environment, e.g., an Arlo® camera available from Arlo Technologies, Inc. of Carlsbad, California. In addition to containing a camera, the monitoring device 18 may also include a one or more sensors configured to detect one or more types of conditions or stimuli, for example, motion, opening or closing events of doors or windows, the presence of smoke, carbon monoxide, water leaks, and temperature changes. Instead of, or in addition to, containing sensors, monitoring device 18 may have audio device(s) such as microphones, sound sensors, and speakers configured for audio communication or providing audible alerts. Other types of monitoring devices 18 may have some combination of sensors 20 and/or audio devices without having imaging capability. One such device is Arlo Chime™, which has only audio capabilities. Sensors 20 or other monitoring devices 18 also may be incorporated into form factors of other house or building accessories, such as doorbells, floodlights, etc.

In order to allow for low and high frequency communication on WLAN 12, it is contemplated for monitoring devices 18 to have two radios operating at different frequencies. A first, "primary" radio operates at a first frequency, typically at a relatively high frequency, typically of 2.4 GHz to 5 GHZ, during periods of normal conductivity to perform monitoring and data capture functions such as video capture and transmission, sound transmission, motion sensing, etc. The second or "secondary radio" operates at a second frequency that is immune to, or at least resistant to, resistance from signals that typically jam signals over the first frequency. The second frequency may be of considerably lower frequency in the sub-GHz or even RF range and may have a longer range than the primary radio. It is intended for the secondary radio to be operable when communications over the primary communication path are disrupted in order to permit the continued operation of monitoring devices 18, as well as to permit transmit and display information regarding the communications disruption to be transmitted and displayed for a user. The term "disruption," as used herein, applies equally to an initial failure to connect over the primary communication path upon device startup and a cessation or break in connection after an initial successful connection. In addition, it is contemplated for each monitoring device 18 to include Bluetooth® or any PAN communications module 35 designated for wireless communication. As is known, module 35 allows monitoring devices 18 to communicate directly with one or more user devices 44a, 44b over a wireless Personal Area Network (PAN) 38 via one or more PAN communication protocols such as Bluetooth®, Zigbee®, Z-Wave™, and MQTT™. Likewise, sensors 20 may similarly include Bluetooth® or any PAN communications module 45 to allow sensor 20 to communicate directly with one or more user devices 44a, 44b over a wireless Personal Area Network (PAN) 38 using one or more PAN communication protocols.

One or more of the client devices 16 may take the form of low energy (LE) devices which utilize Bluetooth® or other PAN communications protocols to communicate. For example, an LE device may take the form of a single touch communication device, such as a panic button and other communication button, generally designated by the reference number 46. Button 46 also is pre-provisioned with a serial number 60. Button 46 also includes an actuatable service request actuator 62 and a processor 48. Button 46 includes a firmware image stored in non-volatile memory thereon. As is conventional, the firmware image acts as the button's complete operating system, performing all control, monitoring and data manipulation functions. Each button 46 further includes a Bl PAN communications technology module 42 designated for wireless communication using low energy "LE" protocols. The module 42 may be a Bluetooth® module. As is known, module 42 allows button 46 to communicate with various components, such as one or more user devices 44 or bridge 19 over PAN 38, as hereinafter described.

In order for an LE device, such as button 46, to communicate on WLAN 12, bridges 19 are provided. Similar to monitoring devices 18, bridges 19 may include two radios operating at different frequencies in order to allow for low and high frequency communication on WLAN 12. A first, "primary" radio operates at a first frequency, typically at a relatively high frequency, typically of 2.4 GHz to 5 GHZ, during periods of normal conductivity. The second or "secondary radio" operates at a second frequency that is immune or at least resistant to resistance from signals that typically jam signals over the first frequency. The second frequency may be of considerably lower frequency in the sub-GHz or even RF range and may have a longer range than the primary radio. It is intended for the secondary radio to be operable, when communications over the primary communication path are disrupted. In addition, it is contemplated for each bridge 19 to include Bluetooth® or any PAN technology module 46 designated for wireless communication. As is known, modules 46 allow bridges 19 to communicate directly with the LE devices over PAN 38, as hereinafter described.

Still referring to FIG. 1, one or more user devices 44, such as a mobile device, smart phone, tablet, laptop, or PC, may communicate with various components of electronic monitoring system 10. It can be understood that user devices 44 may communicate with the various components of electronic monitoring system 10 utilizing WLAN 12, WAN 14 and/or PAN 38 to provide an interface through which a user may interact with electronic monitoring system 10, including client devices 16. Furthermore, in those embodiments of the user device 44, in which the user device 44 is a mobile device, smart phone, tablet or the like configured for cellular communication, the user device 44 may communicate with the WAN 14 over a cellular communication path 43 as shown between user device 44 and mobile provider 32. Accordingly, through communication with the mobile provider 32, each user device 44 may form a communication pathway with the at least one cloud-based server 36 of the cloud-based control service system 34. Alternatively, when operating within WLAN 12, the cellular equipped user device 44 may alternatively communicate with the WAN 14 via the cellular communication path 43 or the gateway router 28 in communication with the internet provider 30. Whether through the Wi-Fi connection to the gateway router 28 or its respective internet provider 30, the user device 44 is configured to form a communication pathway with the cloud-based server 36. Furthermore, each user device 44 includes a display system that typically includes both an audio display and a video display such as a touchscreen. Each user device 44 also has internal computing and storage capabilities and a program or software application, such as the Arlo® Smart application, serving as the user interface with the remainder of system 10. Each user device 44 includes at least one actuatable user input 41, FIGS. 1-2. In response to the information provided on the display of the one or more user devices 44, a user may actuate the at least one actuatable user input 41 to address the information.

Still referring to FIG. 1, within WLAN 12, multiple communication paths 50 are defined that transmit data between the various components of system 10. Communication paths 50 include a default or primary communication path 52 providing communication between monitoring device 18 and the base station hub 26, and a fail-over or fallback secondary communication path 54 providing communication between monitoring device 18 and the security hub 26. Optionally, some of the monitoring devices 18 that do not require high bandwidth to operate may only communicate through the secondary communication path 54, such as sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the peripheral device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. If the security hub 26 and the associated secondary communication path 54 are not present, the sensors 20 may communicate directly with the base station hub 24 (if present, or the router 28 if the functionality of the base station hub is incorporated into the router) via the primary communication path 52.

Primary communication path 52 also extends between bridge 19 and the base station hub 26, and secondary communication path 54 may provide for fail-over or fallback communication between bridge 19 and the security hub 26, if the security hub 26 is present. The controllers of bridges 19 may also provide a wireless communication path directly to the router 28.

As described, electronic monitoring system 10 is configured to implement a seamless OTA communication environment for each client device 16 by implementing a communication path switching strategy as a function of the operational state of primary and/or secondary communication paths, as heretofore described. For example, each monitoring device 18 is configured to acquire data and to transmit the acquired data, or data obtained by processing the acquired data, to a respective hub 24 and/or 26 for further processing and/or further transmission to a server such as the server 36 of the cloud-based control service system 34 and/or the user device(s) 44. The server 36 or other computing components of system 10 or otherwise in the WLAN 12 or WAN 14 can include or be coupled to a microprocessor, a microcontroller or other programmable logic element (individually and collectively considered "a controller") configured to execute a program. The controller also may be contained in whole in the monitoring device 18, base station hub 24, security hub 26, and/or the WIFI hub or router 28. Alternatively, interconnected aspects of the controller and the programs executed by it could be distributed in various permutations within the monitoring device 18, the hubs 24 and 26, router 28, and the server 36. This program may be utilized in filtering, processing, categorizing, storing, recalling, and transmitting data received from the monitoring device 18 via the hubs 24 and 26, router 28, and server 36. Server 36 or another appropriate system device may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording.

Figure 2:
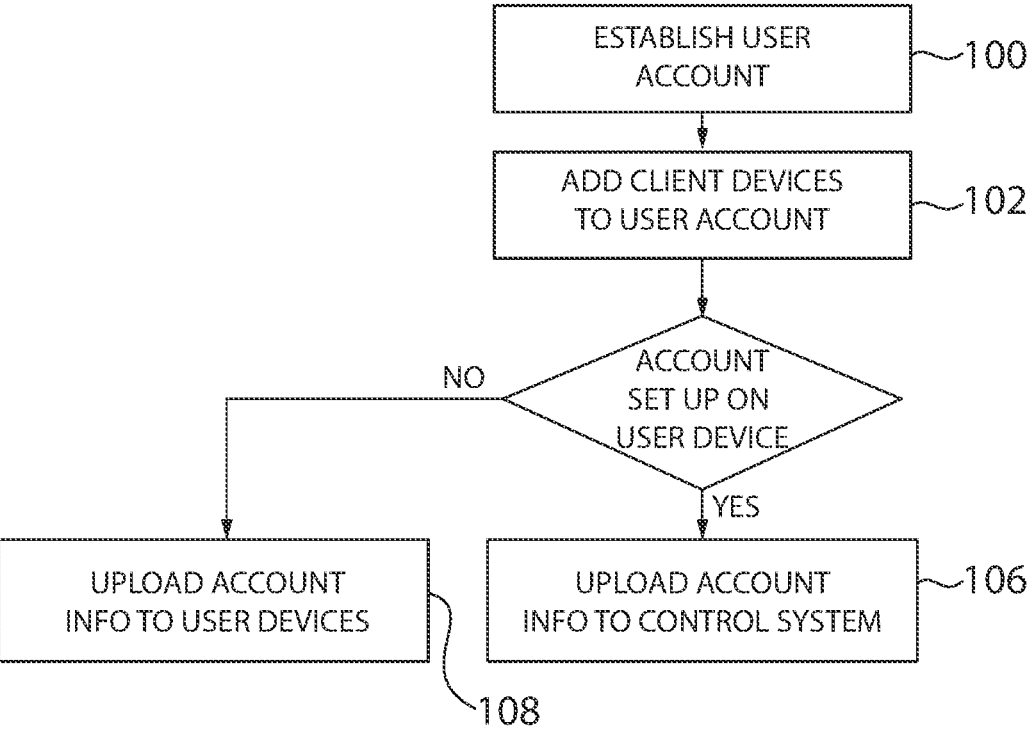
FIG. 2 is a flowchart showing a first set of steps in the methodology of the present invention.

Referring now to the flowchart of FIG. 2, in order to set up the electronic monitoring system 10 of the present embodiment, a user establishes an account with a service provider, e.g., Arlo, through the service provider's webpage or using the service provider's software application on user device 44, block 100. In the account, a user may add or onboard various client devices 16, such as monitoring devices 18, sensors 20, and the LE devices, such as button 46, to the electronic monitoring system 10 associated with the user's account by utilizing, for example, a pre-populated list of devices and simply following a series of on-screen instructions, block 102. Once the various client devices 16 are added to the user's electronic monitoring system 10 through the user's account, information regarding client devices 16, e.g. serial numbers, is uploaded to cloud-based control service system 34, where the information is stored in the computer-readable memory associated with cloud-based backend control service system 34, block 106, for future reference. If a user utilized the service provider's webpage to onboard the various client devices 16, cloud-based control service system 34 uploads the information regarding client devices 16, e.g. serial numbers, to the service provider's software application on user device 44 and saved in the computer-readable memory 33 of user device 44, block 108.

Figure 3:
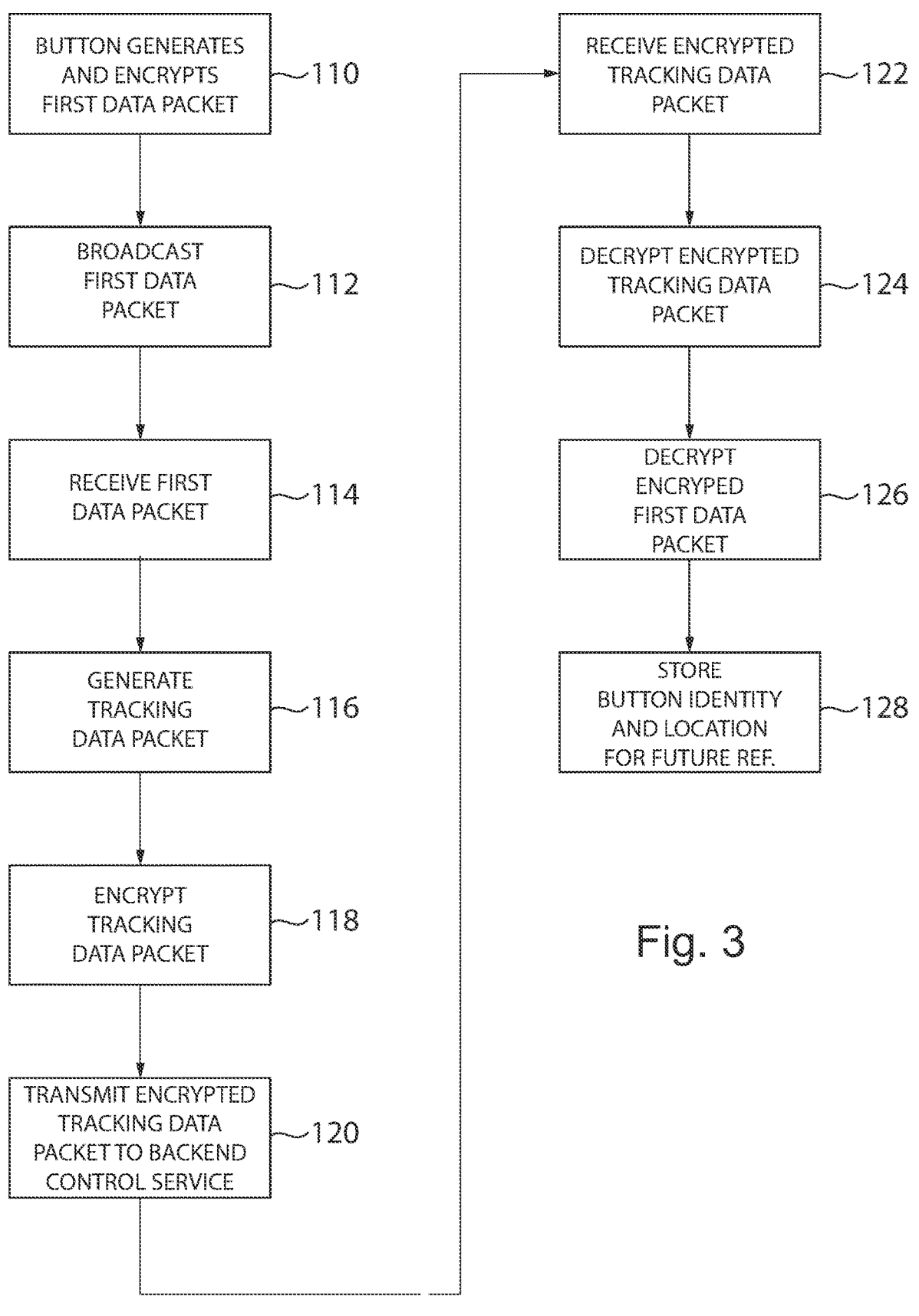
FIG. 3 is a flowchart showing a second set of steps in the methodology of the present invention.

Referring now to FIG. 3, in operation, it is contemplated for processor 48 of button 46 to periodically generate a first data packet corresponding to the identity of button 46, such as a serial number, and its current state, and to encrypt the first data packet, block 110. The encrypted first data packet is broadcast over PAN 38, block 112. It can be appreciated that, utilizing a user device 44 logged into the user's account, a user can set the time period when processor 48 of button 46 periodically encrypts the first data packet and broadcasts the encrypted first data packet over PAN 38. It is intended that the encrypted first data packet is receivable by one or more user devices 44 and/or a corresponding bridge 19 of electronic monitoring system 10 which, in turn, transmits the encrypted first data packet to a respective hub 24 and/or 26, block 114. The user does not have to be logged into the user's account on a corresponding user device 44 for the one or more user devices 44 to receive the encrypted first data packet transmitted by button 46.

The software application on each user device 44 that receives the encrypted first data packet generates a tracking data packet which includes the encrypted first data packet and a location of the user device 44 which received the encrypted first data packet, block 116. The software application on the user device 44 which received the encrypted first data packet will then encrypt the tracking data packet, block 118, and transmit the encrypted tracking data packet to backend control service system 34 in a manner heretofore described, block 120.

Similarly, if hub 24 and/or hub 26 receives the encrypted first data packet, software on hub 24 and/or 26 will generate a tracking data packet which includes the encrypted first data packet received and a location of hub 24/26 which received the encrypted first data packet, block 116. The software will then encrypt the tracking data packet, block 118, and transmit the encrypted tracking data packet to backend control service system 34 in a manner heretofore described block 120.

Upon receipt of encrypted tracking data packet, server 36 of the cloud-based control service system 34, block 122, the encrypted tracking data packet is decrypted by server 36, block 124, along with encrypted first data packet, block 126. Thereafter, the identity of button 46 (e.g., the serial number), the current state of button 46, and the location of user device 44 or hub 24/26 which received the encrypted first data packet are stored on the computer-readable memory associated with cloud-based control service system 34, block 128.

The noted process is repeated each time button 46 periodically broadcasts the encrypted first data packet over PAN 38 which, in turn, is transmitted along with the location of a corresponding user device 44 and/or hub 24/26 which received the encrypted first data packet to cloud-based control service system 34, thereby allowing for cloud-based control service system 34 to store tracking information regarding the location of button 46 over time.

Referring to FIG. 4, in the event a user requires immediate assistance, the user may actuate service request actuator 62 on button 46, block 130, thereby causing processor 48 of button 46 to generate a second data packet in response thereto, block 132. The second data packet includes data corresponding to a service request and the identity of button 46 (e.g., the serial number). The second data packet is encrypted, block 134, and broadcast over PAN 38, block 136. It is intended for the encrypted second data packet to be receivable by one or more user devices 44 and/or a corresponding bridge 19 of electronic monitoring system 10 which, in turn, transmits the encrypted second data packet to a respective hub 24 and/or 26, block 138. The user does not have to be logged into the user's account on a corresponding user device 44 for the one or more user devices 44 to receive the encrypted second data packet transmitted by button 46. It is possible that the nature of the alarm and the response to that alarm may depend on the manner in which the request actuator is actuated. For example, touching the button once may indicate a low-level alarm requiring a lower-level response, such as the transmission of an information text to a family member's user device, whereas touching the actuator 62 multiple times in rapid succession may indicate an emergency or panic situation requiring a higher level response, such as the transmission of a call for assistance to emergency services.

The software application on each user device 44 that receives the encrypted second data packet, block 140, generates an alarm data packet which includes the encrypted second data packet received and a location of the user device 44 which received the encrypted second data packet, block 142. The software application on the user device 44 which received the encrypted second data packet will then encrypt the alarm data packet, block 144, and transmit the encrypted alarm data packet to backend control service system 34 in a manner heretofore described, block 146.

Similarly, if hub 24 and/or 26 receives the encrypted second data packet, block 140, software on hub 24 and/or 26 will generate the alarm data packet which includes the encrypted second data packet received and a location of hub 24/26 which received the encrypted second data packet, block 142. The software will then encrypt the alarm data packet, block 144, and transmit the encrypted alarm data packet to backend control service system 34 in a manner heretofore described, block 146.

Upon receipt of encrypted alarm data packet, server 36 of the cloud-based control service system 34, block 148, the encrypted alarm data packet is decrypted by server 36, block 150, along with encrypted second data packet, block 152. Thereafter, the identity of button 46 (e.g. the serial number), and the location of user device 44 or hub 24/26 which received the encrypted second data packet, and the locations of button 46 over time which are stored on the computer-readable memory associated with cloud-based control service system 34 are analyzed to calculate/determine a current location of button 46, block 154. Once the current location is determined, it is contemplated for cloud-based control service system 34 to generate and transmit instructions in any desired manner, such as by audio message sent via telephone, an email message or a text, requesting assistance to be provided to the user at the current location of button 46, block 156. The message may be sent to any or all of a number of recipient types including a service center, an emergency services contact center, and/or trusted individuals such as family members or neighbors. As mentioned above, it is possible that the chosen recipient type for a particular message may depend on the nature of that message and the underlying reason for its generation and transmission.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system, comprising:
   a Wireless Local Area Network (WLAN) operating environment comprising a gateway and at least one bridge device, the at least one bridge device comprising:
     (i) a primary radio that communicates with the gateway at a first frequency first frequency in the absence of a disruption in communication between the primary radio and the gateway,
     (ii) a secondary radio that communicates with the gateway at a second frequency when communication between the primary radio and gateway is disrupted, the second frequency being lower than the first frequency, and
     (iii) a Personal Area Network (PAN) module configured to communicate with a low energy device over a wireless Personal Area Network (PAN)
   the low energy device being a button having an actuatable actuator and an identity, the button configured for crowd sourced tracking utilizing short range wireless communication; and
   a processor operatively connected to the button and being configured to:
     encrypt a first data packet corresponding to the identity of the button and periodically broadcast the encrypted first data packet over a wireless Personal Area Network (PAN wherein the encrypted first data packed is configured to be received over the PAN by one of a plurality of devices selected from a group comprising the WLAN bridge devices and user devices,
     encrypt a second data packet corresponding to a service request and the identity of the button in response to actuation of the actuator; and
     broadcast the encrypted second data packet over a communications network.

2. The electronic monitoring system of claim 1, further comprising:
   a cloud-based control service;

a first user device including a processor and a software application stored in computer-readable memory, the button being associated with the first user device and the software application allowing a user to communicate with and configure the button; and a plurality of non-associated user devices, each non-associated user device including a processor and the software application stored in computer-readable memory; wherein each of the plurality of non-associated user devices is configured to:

receive the encrypted first data packet and generate a third data packet including the encrypted first data packet and a location of the non-associated user device;

encrypt the third data packet; and transmit the encrypted third data packet to the cloud-based control service.

3. The electronic monitoring system of claim 2, wherein each of the plurality of non-associated user devices is configured to:

receive the encrypted second data packet and generate a fourth data packet including the encrypted second data packet and the location of the non-associated user device;

encrypt the fourth data packet; and transmit the encrypted fourth data packet to the cloud-based control service.

4. The electronic monitoring system of claim 2, wherein the cloud-based control service includes a processor and computer-readable memory, the processor of the cloud-based control service is configured to decrypt the first and third data packets, the identity of the button and location of the non-associated user device being stored in the computer-readable memory of the cloud-based control service for future reference.

5. The electronic monitoring system of claim 4, wherein the processor of the cloud-based control service is configured to decrypt the second and fourth data packets, the cloud-based control service generating an action in response to the service request, the identity of the button and locations received from each of the non-associated user devices.

6. The electronic monitoring system of claim 1, wherein the first frequency is at least 2.4 MHz.

7. The electronic monitoring system of claim 1, wherein the second frequency is less than one MHz.

8. The electronic monitoring system of claim 1, wherein the first frequency is at least 2.4 MHz, and the second frequency is less than one MHz.

9. The electronic monitoring system of claim 1, wherein the disruption is a jamming of the communication.

10. The electronic monitoring system of claim 1, wherein the disruption constitutes one or more of a failure to connect at the first frequency upon low energy device startup and a cessation or break in connection at the first frequency after an initial successful connection at the first frequency.

* * * * *